(12) United States Patent
Thomas et al.

(10) Patent No.: US 7,506,663 B2
(45) Date of Patent: Mar. 24, 2009

(54) MAGNETIC CHECK VALVE

(75) Inventors: Chad M. Thomas, Algood, TN (US);
Abby True-Dahl, Sparta, TN (US);
Peter K. Herman, Cookeville, TN (US);
Mark T. Wieczorek, Cookeville, TN (US); Mark J. Johnson, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 357 days.

(21) Appl. No.: 11/490,330

(22) Filed: Jul. 20, 2006

(65) Prior Publication Data
US 2008/0017256 A1  Jan. 24, 2008

(51) Int. Cl.
*F16K 15/02* (2006.01)
*F16K 31/08* (2006.01)

(52) U.S. Cl. ............. 137/529; 137/533.19; 137/533.21; 137/533.31; 251/65

(58) Field of Classification Search ............ 137/533.31, 137/533.19, 529, 533.2; 251/65
See application file for complete search history.

(56) References Cited

U.S. PATENT DOCUMENTS

| | | | |
|---|---|---|---|
| 197,453 A * | 11/1877 | Bradley | ................ 137/533.19 |
| 2,569,316 A | 9/1951 | Jerman | |
| 2,608,376 A | 8/1952 | Adams | |
| 2,609,835 A | 9/1952 | Horvay | |
| 2,646,071 A | 7/1953 | Wagner | |
| 2,667,895 A | 2/1954 | Pool et al. | |
| 2,939,475 A * | 6/1960 | Roach | .......................... 251/65 |
| 2,949,931 A | 8/1960 | Ruppright | |
| 3,026,903 A | 3/1962 | Roach | |
| 3,217,736 A | 11/1965 | Voss | |
| 3,495,620 A | 2/1970 | Raimondi et al. | |
| 4,273,153 A * | 6/1981 | Brown | .......................... 251/65 |
| 4,275,759 A | 6/1981 | Huang | |
| 4,792,113 A | 12/1988 | Eidsmore | |
| 4,874,012 A | 10/1989 | Velie | |
| 5,320,136 A | 6/1994 | Morris et al. | |
| 6,000,417 A * | 12/1999 | Jacobs | .......................... 251/65 |

* cited by examiner

*Primary Examiner*—John Rivell
(74) *Attorney, Agent, or Firm*—Andrus, Sceales, Starke & Sawall, LLP; J. Bruce Schelkopf (57) ABSTRACT

A magnetic check valve includes a cage mountable in a fluid flow duct and supporting a plunger movable between a closed position blocking fluid flow past the valve, and an open position permitting fluid flow past the valve. One of the cage and the plunger includes a magnet, and the other of the cage and the plunger includes ferrous material magnetically attracted to the magnet to magnetically bias the plunger to the closed position.

20 Claims, 7 Drawing Sheets

MAGNETIC CHECK VALVE

BACKGROUND AND SUMMARY

The invention relates to magnet check valves, and more particularly to simplified and manufacturing-efficient structure therefor.

Magnetic check valves are known in the prior art. The present invention arose during development efforts directed toward magnetic check valves with simplified geometry and cost-effective manufacturability.

DETAILED DESCRIPTION

Figure 1:
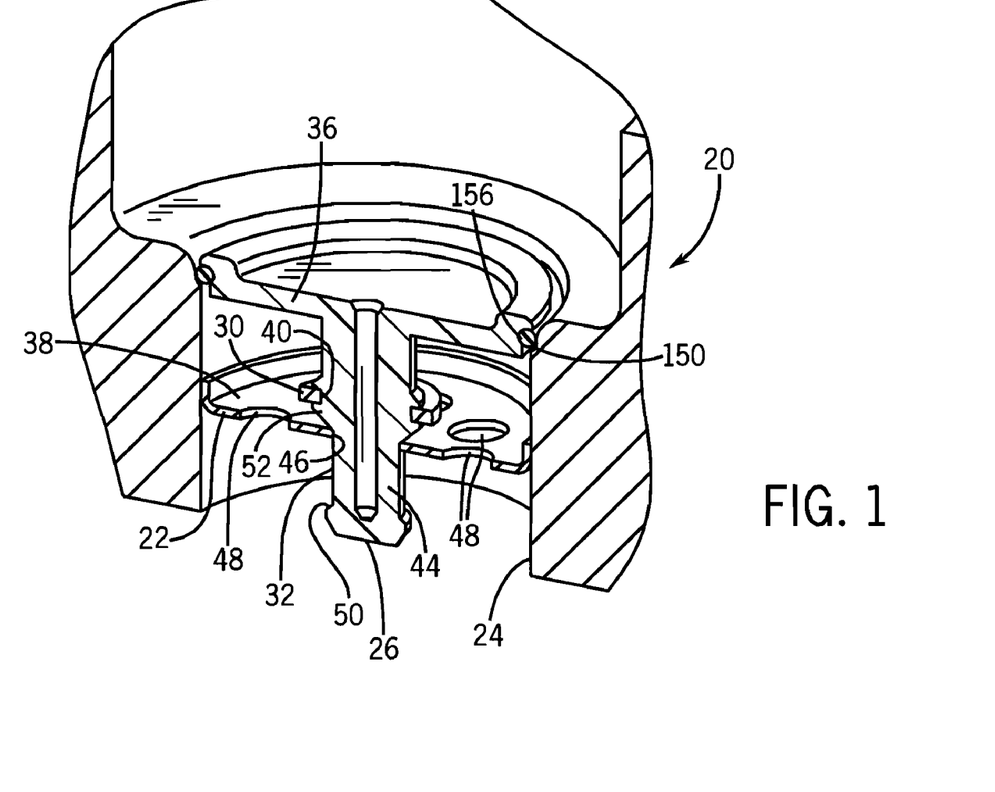
FIG. 1 is a sectional perspective view of a magnetic check valve in accordance with the invention.
Figure 2:
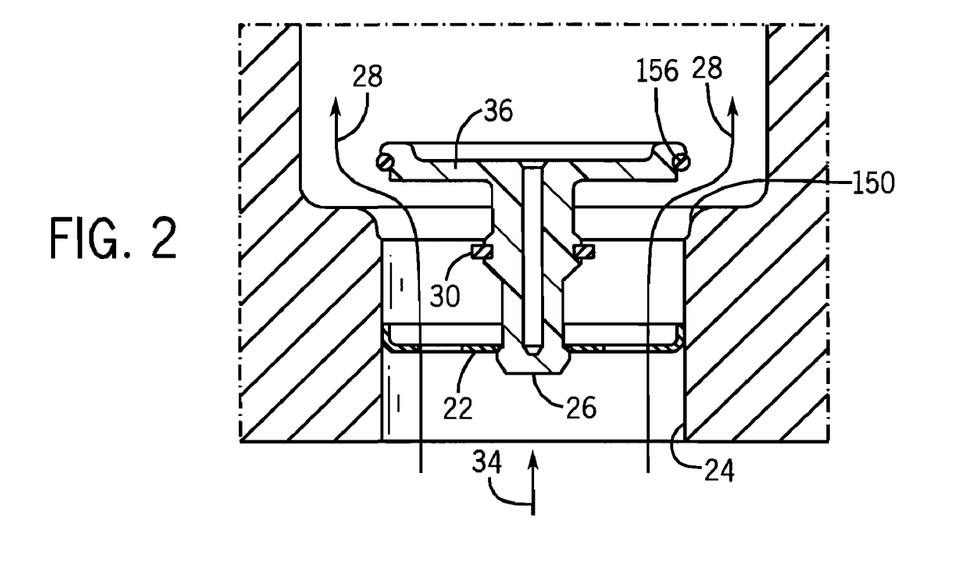
FIG. 2 is a side sectional view of the valve of FIG. 1, showing an open position.
Figure 3:
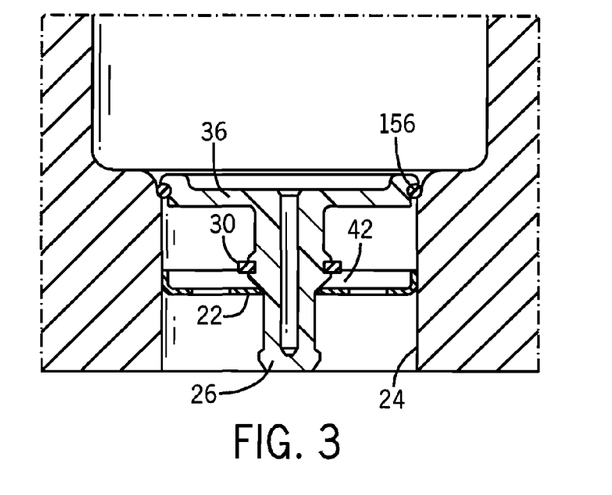
FIG. 3 is like FIG. 2 and shows a closed position.

FIG. 1 shows a magnetic check valve 20 including a cage 22 mountable in a fluid flow duct 24 and supporting a plunger 26 movable between a closed position, FIG. 3, blocking fluid flow past the valve, and an open position, FIG. 2, permitting fluid flow past the valve as shown at arrows 28. One of the cage and plunger includes a magnet, for example magnet 30 on plunger 26. The other of the cage and plunger includes ferrous material, for example cage 22 being formed of ferrous material, magnetically attracted to magnet 30 to magnetically bias plunger 26 to the closed position, FIG. 3. Fluid flows axially as shown at arrows 28 in duct 24. Plunger 26 slides axially along cage 22 and engages the cage in axial sliding relation along an axial guide track 32. Fluid flows along axial flow direction 34 from upstream to downstream in duct 24, e.g. upwardly in FIGS. 1-3. Plunger 26 includes a disk 36 spanning laterally relative to axial flow direction 34 and magnetically biased in an upstream axial direction to the closed position, i.e. downwardly to the position shown in FIG. 3. Plunger 26 with disk 36 is movable in a downstream axial direction (upwardly in FIGS. 1-3) from the closed position of FIG. 3 to the open position of FIG. 2 against the noted magnetic bias.

In the embodiment of FIGS. 1-3, cage 22 is provided by a ferrous plate 38, and magnet 30 is secured to plunger 26 downstream of plate 38. The plunger includes a mounting seat 40 securing magnet 30 thereto and spacing the magnet from ferrous plate 38 by a magnetic gap 42, FIG. 3, of defined axial length in the closed position. Plunger 26 has at least one leg 44 extending axially upstream from disk 36. Cage 22 has at least one guide bore 46 receiving leg 44 and guiding axial movement of the leg therethrough. In the embodiment of FIGS. 1-3, plunger 26 has a central leg 44 providing a pedestal extending axially upstream from disk 36. Plate 38 has a central guide bore 46 receiving pedestal 44 and guiding axial movement of the pedestal therethrough. Pedestal 44 co-acting with guide bore 46 provides the noted guide track 32. Plate 38 has a plurality of apertures 48 around central guide bore 46. Apertures 48 permit fluid flow axially therethrough. Magnet 30 is an annular ring magnet circumscribing pedestal 44.

Pedestal 44 has first and second shoulders 50 and 52 axially spaced therealong. Shoulder 50 engages plate 38 at central guide bore 46, FIG. 2, during downstream axial movement of pedestal 44 along central guide bore 46 to limit and stop opening of the valve. Shoulder 52 is axially spaced downstream from shoulder 50 and provides a mounting location for magnet 30 and sets the axial length of magnetic gap 42 between plate 38 and magnet 30 in the closed position, FIG. 3.

Figure 4:
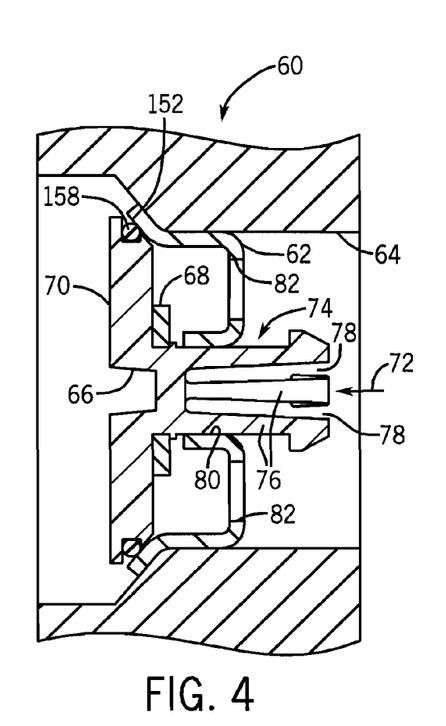
FIG. 4 is like FIG. 3 and shows another embodiment.

FIG. 4 shows a magnetic check valve 60 including a cage 62 mountable in a fluid flow duct 64 and supporting a plunger 66 moveable between a closed position, FIG. 4, blocking fluid flow past the valve, and an open position permitting fluid flow past the valve. A magnet 68 is mounted on plunger 66, and the cage 62 is provided by a ferrous material plate magnetically attracted to magnet 68 to magnetically bias plunger 66 to the closed position. The plunger includes a disk 70 spanning laterally relative to axial flow direction 72, and a pedestal 74 extending axially upstream from disk 70 and provided by a plurality of extension legs 76 laterally spaced by gaps 78 therebetween permitting fluid flow therethrough. Cage 62 has a central guide bore 80 receiving pedestal 74 and guiding axial movement of the pedestal therethrough. The cage may have a plurality of apertures 82 around central guide bore 80, which apertures permit fluid flow axially therethrough. Alternatively, apertures 82 may be eliminated, whereby fluid flow in the open valve position is only through gaps 78 between extension legs 76.

Figure 5:
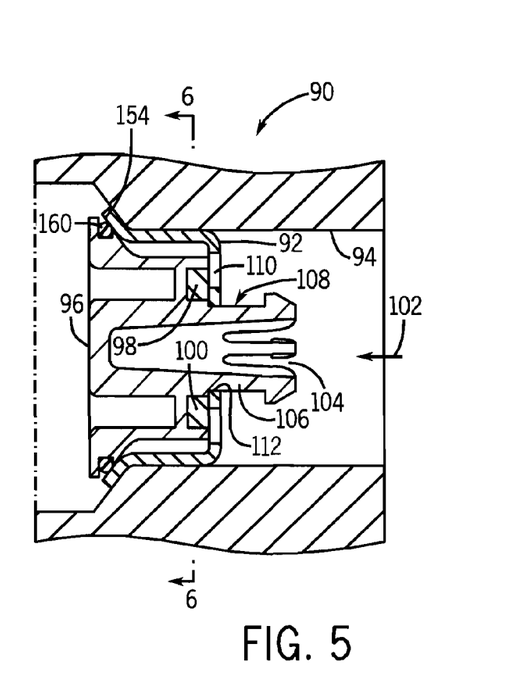
FIG. 5 is like FIG. 4 and shows another embodiment.
Figure 6:
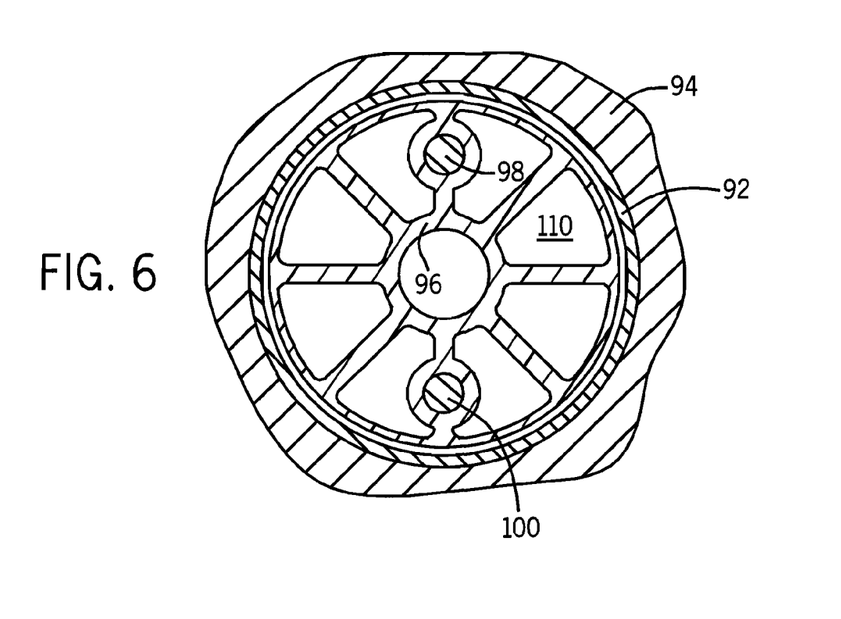
FIG. 6 is a sectional view taken along line 6-6 of FIG. 5.

FIG. 5 shows a magnetic check valve 90 similar to that of FIG. 4 and including a cage 92 mountable in a fluid flow duct 94 and supporting a plunger 96 movable between a closed position, FIG. 5, blocking fluid flow past the valve, and an open position permitting fluid flow past the valve. Plunger 96 has a plurality of magnets such as 98, 100 mounted thereto, and cage 92 is ferrous material magnetically attracted to the magnets to magnetically bias plunger 96 to the closed position. In FIG. 4, magnet 68 is a ring magnet circumscribing the plunger. In FIG. 5, a plurality of cylindrical magnets 98, 100, etc. are circumferentially spaced around the plunger, FIG. 6. In the open position of the valve 90, fluid may flow axially along axial flow direction 102 through lateral gaps 104 between extension legs 106 of plunger pedestal 108 and/or may flow through apertures 110 around central guide bore 112, which apertures 110 may have various shapes, e.g. pie shapes, FIG. 6.

Figure 7:
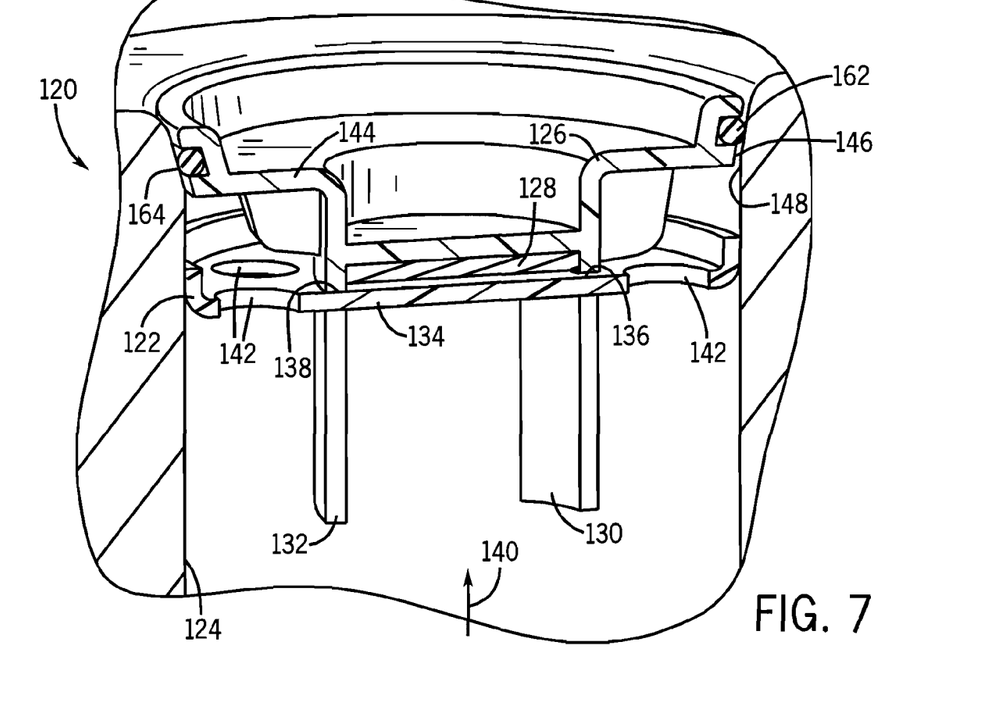
FIG. 7 is a sectional perspective view showing another embodiment.

FIG. 7 shows a magnetic check valve 120 including a cage 122 mountable in a fluid flow duct 124 and supporting a plunger 126 movable between a closed position, FIG. 7, blocking fluid flow past the valve, and an open position permitting fluid flow past the valve. A magnet 128 is mounted on the plunger, and cage 122 is ferrous material magnetically attracted to magnet 128 to magnetically bias plunger 126 to its closed position. The plunger has a plurality of legs 130, 132, etc., extending axially therefrom. Cage 122 is provided by a plate 134 having one or more guide bores 136, 138 each receiving one or more of the noted legs 130, 132 and guiding axial movement of the legs therethrough along axial direction 140. In the embodiment of FIGS. 7 and 1-3, each guide bore receives and guides one leg therethrough. In the embodiment of FIGS. 4 and 5, the guide bore receives and guides a plurality of legs therethrough. In FIG. 7, as in FIGS. 1-6, magnet 128 is secured to plunger 126 downstream of plate 134 and is adjacent the plate in the closed position, and is axially spaced downstream from the plate in the open position. In FIG. 7, magnet 128 is disk-shaped and spans laterally relative to axial flow direction 140 and is circumferentially surrounded by the noted plurality of legs 130, 132, etc. Plate 134 has a plurality of apertures 142 laterally spaced from guide bores 136, 138. Apertures 142 permit fluid flow axially therethrough.

Plunger 126, FIG. 7, includes a disk 144 spanning laterally relative to axial flow direction 140 and magnetically biased in an upstream axial direction (downwardly in FIG. 7) to the closed position as shown in FIG. 7. The disk has a first sealing surface 146 sealingly engaging a second sealing surface on one of the cage and the duct in the closed position. In FIG. 7, the noted second sealing surface is provided by surface 148 of duct 174. In FIGS. 1-3, the noted second sealing surface is provided by surface 150 of duct 24. In FIG. 4, the noted second sealing surface is provided by surface 152 of cage 62. In FIG. 5, the noted second sealing surface is provided by surface 154 of cage 92. If desired, a sealing gasket may be provided between the noted first and second sealing surfaces and providing sealing engagement, for example as shown at sealing gaskets 156, 158, 160, 162, FIGS. 1, 4, 5, 7, respectively. One or both of the noted sealing surfaces may be beveled along a taper as shown at 164, FIG. 7, providing increasing tightness of fit against the other sealing surface upon axial advancement of the respective plunger to the closed position.

Figure 8:
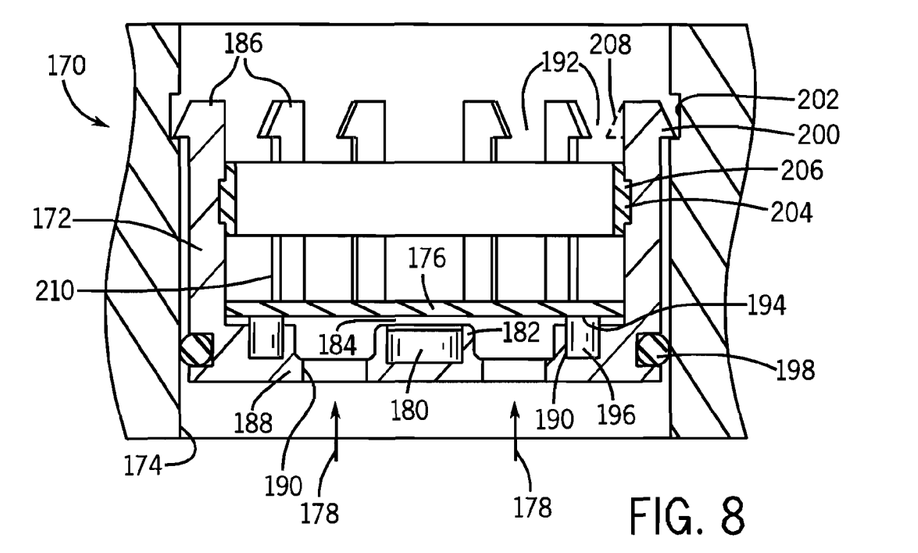
FIG. 8 is a side sectional view showing another embodiment.

FIG. 8 shows a magnetic check valve 170 including a cage 172 mountable in a fluid flow duct 174 and supporting a plunger 176 movable between a closed position, FIG. 8, blocking fluid flow past the valve, and an open position permitting fluid flow past the valve. Fluid flows in an axial flow direction 178 from upstream to downstream in duct 174. A magnet 180 is mounted to cage 172, and plunger 176 is ferrous material magnetically attracted to magnet 180 to bias plunger 176 downwardly to the closed position as shown in FIG. 8. Plunger 176 is provided by a disk spanning laterally relative to axial flow direction 178 and magnetically biased in an upstream axial direction (downwardly in FIG. 8) to the noted closed position. Disk 176 is a ferrous plate. Magnet 180 is secured to cage 172 upstream of ferrous plate 176. Cage 172 includes a mounting seat 182 securing magnet 180 thereto and spacing the magnet from ferrous plate 176 by a magnetic gap 184 of defined axial length in the closed position. Cage 172 has at least one and preferably a plurality of legs 186 extending axially downstream therefrom and guiding axial movement of plunger disk 176 therealong. Legs 186 laterally circumscribe disk 176 and guide the disk for axial movement therealong. Cage 172 has an upstream face plate 188 spanning laterally relative to axial flow direction 178. Face plate 188 has one or more apertures 190 permitting fluid flow axially therethrough in the open valve position. Legs 186 of cage 172 are laterally spaced by gaps 192 therebetween permitting fluid flow therethrough. Disk 176 in the closed position engages face plate 188 along a sealing surface 194, which may include an annular sealing gasket 196 laterally circumscribing apertures 190. Cage 172 is sealed within duct 174 by annular sealing gasket 198. Legs 186 may have outer shoulders or detents 200 mounted in detents or recesses 202 in duct 174. Legs 186 have a stop shoulder 204 spaced axially downstream of face plate 188 and engaging disk 176 during downstream axial movement of the disk to limit and stop opening of the valve. Stop shoulder 204 may be provided by an annular inner ring or sleeve secured within recesses 206 in legs 186. Alternatively, the stop shoulder may be provided by laterally inwardly extending projections or barbs on legs 186 as shown in dashed line at 208. Legs 186 along their axial downstream extension provide the noted guide track at 210 extending axially downstream from face plate 188 and laterally circumscribing sealing surface 196 and laterally circumscribing and engaging disk 176 and guiding the disk for axial movement therealong.

Figure 9:
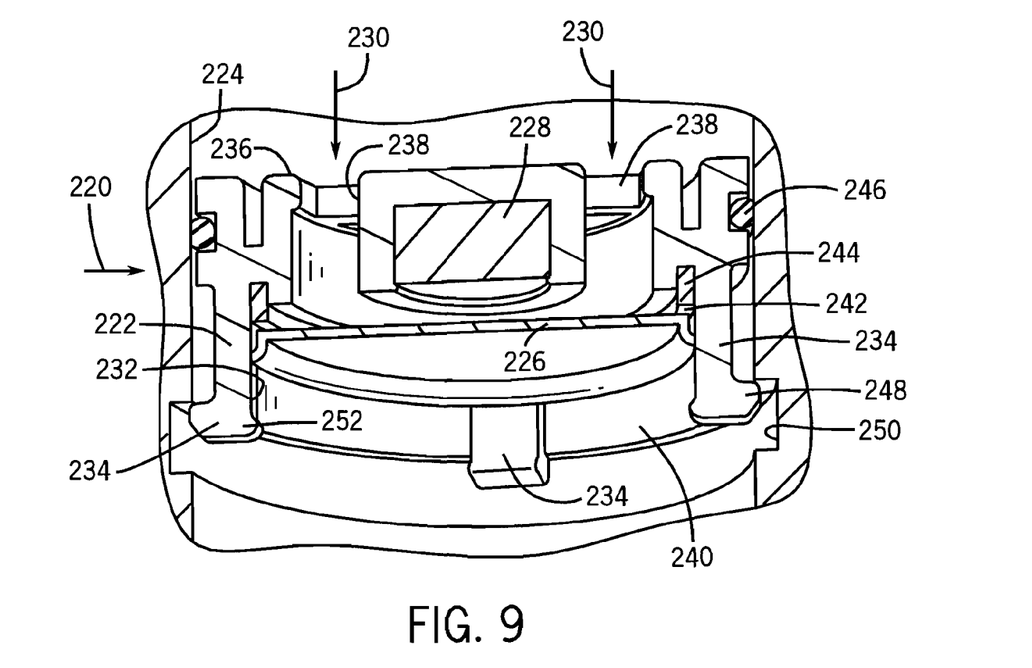
FIG. 9 is a sectional perspective view showing another embodiment.

FIG. 9 shows a magnetic check valve 220 including a cage 222 mountable in a fluid flow duct 224 and supporting a plunger 226 movable between a closed position, FIG. 9 blocking fluid flow past the valve, and an open position permitting fluid flow past the valve. A magnet 228 is mounted to cage 222, and plunger 226 is ferrous material magnetically attracted to magnet 228 to magnetically bias plunger 226 to the closed position. Fluid flows axially in duct 224 along an axial flow direction 230 from upstream to downstream (downwardly in FIG. 9). Plunger 226 slides axially along cage 222 and engages the cage in axial sliding relation along axial guide track 232 provided by a plurality of legs 234 extending axially downstream. Plunger 226 is a disk spanning laterally relative to axial flow direction 230 and is magnetically biased in an upstream axial direction (upwardly in FIG. 9) to the closed position, and is movable in a downstream axial direction from the closed position to the open position against the magnetic bias. Cage 222 has the noted legs 234 extending axially downstream therefrom and laterally circumscribing disk 226 and guiding the disk for axial movement therealong. Cage 222 has an upstream face plate 236 spanning laterally relative to axial flow direction 230. Face plate 236 has one or more apertures 238 permitting fluid flow axially therethrough. Legs 234 of cage 222 are laterally spaced by gaps 240 therebetween permitting fluid flow therethrough. Disk 226 in the closed position engages face plate 236 along a sealing surface 242, which may include a gasket 244, laterally circumscribing apertures 238. Cage 222 is mounted in duct 224 in sealing relation at gasket 246, and is held in place at outer shoulders 248 in recesses 250 of the duct. The legs have inner stop shoulders 252 spaced axially downstream of face plate 236 and engaging disk 226 during downstream axial movement of the disk to limit and stop opening of the valve. Guide track 232 extends axially downstream from face plate 236 and laterally circumscribes sealing surface 242 and laterally circumscribes and engages disk 226 and guides the disk for axial movement therealong.

Figure 10:
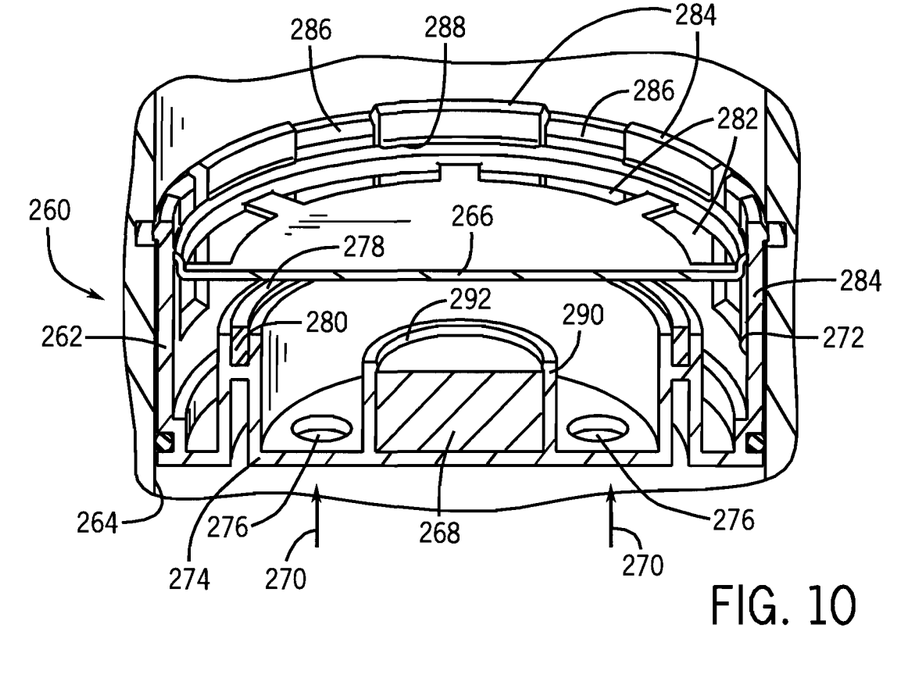
FIG. 10 is a sectional perspective view showing another embodiment.

FIG. 10 shows a magnetic check valve 260 including a cage 262 mountable in a fluid flow duct 264 and supporting a plunger 266 movable between a closed position blocking fluid flow past the valve, and an open position permitting fluid flow past the valve. Cage 262 has a magnet 268 mounted thereto, and plunger 266 is ferrous material magnetically attracted to magnet 268 to magnetically bias plunger 266 to the closed position. Fluid flows axially in duct 264 along an axial flow direction 270 from upstream to downstream (upwardly in FIG. 10). Plunger 266 slides axially along cage 262 and engages the cage in axial sliding relation along axial guide track 272. Plunger 266 is provided by a disk spanning laterally relative to axial flow direction 270 and magnetically biased in the upstream axial direction (downwardly in FIG. 10) to the closed position, and movable in a downstream axial direction from the closed position to the open position against the magnetic bias. Cage 262 has an upstream face plate 274 spanning laterally relative to axial flow direction 270. Face plate 274 has one or more apertures 276 permitting fluid flow axially therethrough. Disk 266 in its closed position engages the face plate along a sealing surface 278, which may include a sealing gasket 280, laterally circumscribing apertures 276. Cage 262 includes the noted guide track 272 extending axially downstream from face plate 274 and laterally circumscribing sealing surface 278 and laterally circumscribing and engaging disk 266 and guiding the disk for axial movement therealong. Disk 266 has one or more apertures 282 permitting fluid flow axially therethrough. Apertures 282 are laterally between sealing surface 278 and guide track 272. Guide track 272 is provided by a solid annular wall or by a plurality of circumferentially spaced legs 284 separated by circumferential lateral gaps 286 permitting fluid flow therethrough, in addition to or in place of apertures 282. Guide track 272 has a stop shoulder 288 spaced axially downstream of face plate 274 and engaging disk 266 during downstream axial movement of the disk to limit and stop opening of the valve. Disk 266 is provided by a ferrous plate, and magnet 268 is secured to cage 262 upstream of such ferrous plate. Cage 262 includes a mounting seat 290 securing magnet 268 thereto and spacing the magnet from ferrous plate 266 by a magnetic gap 292 of defined axial length in the closed position. Face plate 274 has the noted apertures 276 laterally circumscribing mounting seat 290 and magnet 268.

Figure 11:
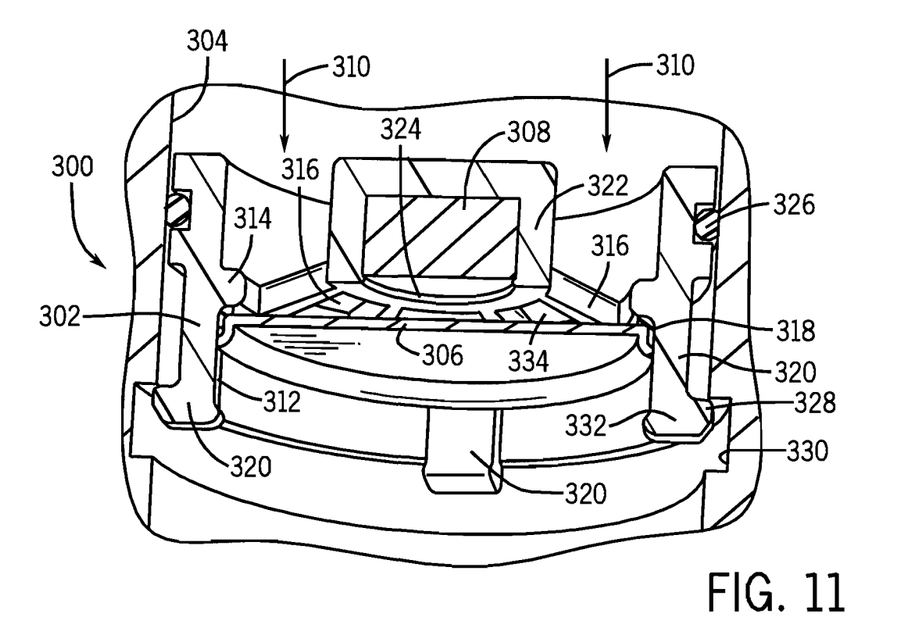
FIG. 11 is a sectional perspective view showing another embodiment.

FIG. 11 shows a magnetic check valve 300 including a cage 302 mountable in a fluid flow duct 304 and supporting a plunger 306 movable between a closed position blocking fluid flow past the valve, and an open position permitting fluid flow past the valve. Cage 302 has a magnet 308 mounted thereto, and plunger 306 is ferrous material magnetically attracted to magnet 308 to magnetically bias plunger 306 to the closed position. Fluid flows axially in duct 304 along an axial flow direction 310 from upstream to downstream (downwardly in FIG. 11). Plunger 306 slides axially along cage 302 and engages the cage in axial sliding relation along an axial guide track 312. Plunger 306 is provided by a disk spanning laterally relative to axial flow direction 310 and magnetically biased in an upstream axial direction (upwardly in FIG. 11) to the closed position, and movable in a downstream axial direction from the closed position to the open position against the magnetic bias. Cage 302 has an upstream axial face plate 314 spanning laterally relative to axial flow direction 310. Face plate 314 has one or more apertures 316 permitting fluid flow axially therethrough. Disk 306 in the closed position engages face plate 314 along a sealing surface 318 laterally circumscribing apertures 316. Cage 302 has a plurality of legs 320 extending axially downstream therefrom and laterally circumscribing disk 306 and forming the noted guide track 312 guiding disk 306 for axial movement therealong. Disk 306 is a ferrous plate, and magnet 308 is secured to cage 302 upstream of ferrous plate 306. Cage 302 includes a mounting seat 322 securing magnet 308 thereto and spacing magnet 308 from ferrous plate 306 by a magnetic gap 324 of defined axial length in the closed position. Face plate 314 has the noted plurality of apertures 316 laterally circumscribing mounting seat 322 and magnet 308. Cage 302 is sealed in duct 304 by gasket 326, and is held in place by outer shoulders 328 on legs 320 received in detents or recesses 330 in the duct. Legs 320 have inner shoulders 332 at their downstream ends along guide track 312 providing stop shoulders spaced axially downstream of face plate 314 and engaging disk 306 during downstream axial movement of the disk to limit and stop opening of the valve.

Face plate 314, FIG. 11, has an annular segment 334 spanning laterally between mounting seat 322 and sealing surface 318. Annular segment 334 has the noted plurality of apertures 316 therethrough. Annular segment 334 has an outer border at sealing surface 318, and has an inner border at mounting seat 322. Annular segment 334 is tapered upstream as it laterally spans from its noted outer border to its noted inner border such that its noted inner border is axially spaced from disk 306 in the closed position by a first axial gap. The degree of the noted taper controls the magnetic gap between disk 306 and magnet 308 provided by the noted first axial gap. The noted outer border of annular segment 334 is spaced from disk 306 in the closed position by a second axial gap, which may be zero if no gasket is used at sealing surface 318. The noted first axial gap is greater than the noted second axial gap due to the noted taper of annular segment 334.

Figure 12:
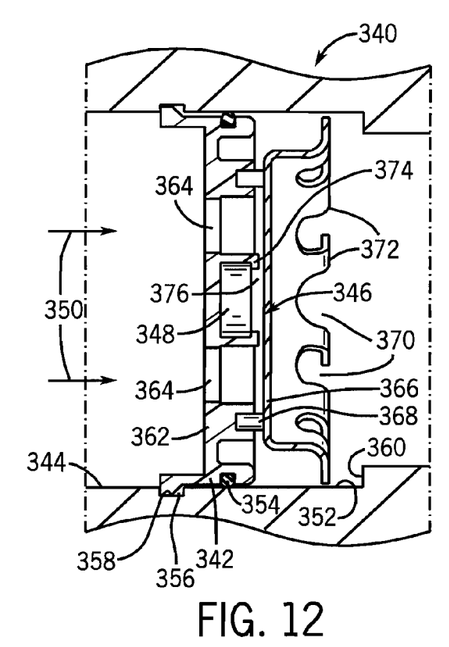
FIG. 12 is a side sectional view showing another embodiment.

FIG. 12 shows a magnetic check valve 340 including a cage 342 mountable in a fluid flow duct 344 and supporting a plunger 346 movable between a closed position blocking fluid flow past the valve, and an open position permitting fluid flow past the valve. Cage 342 has a magnet 348 mounted thereto, and plunger 346 is ferrous material magnetically attracted to magnet 348 to magnetically bias plunger 346 to its closed position. Fluid flows axially in duct 344 along an axial flow direction 350 from upstream to downstream (rightwardly in FIG. 12). Plunger 346 slides axially in duct 344 in axial sliding relation along an axial guide track 352 along the wall of the duct. Plunger 346 is provided by a disk spanning laterally relative to axial flow direction 350 and magnetically biased in an upstream axial direction (leftwardly in FIG. 12) to the closed position, and movable in a downstream axial direction from the closed position to the open position against the magnetic bias. Cage 342 is sealed in duct 344 at gasket 354 and is held in place at shoulders 356 protruding into recesses 358 in the duct sidewall. The duct sidewall also forms guide track 352 for plunger disk 346, which guide track has a stop shoulder 360 engaging disk 346 during downstream axial movement of the disk to limit and stop opening of the valve. Cage 342 has an upstream face plate 362 having one or more apertures 364 permitting fluid flow axially therethrough. Disk 346 in the closed position engages face plate 362 along a sealing surface 366, which may include an annular sealing gasket 368, laterally circumscribing apertures 364. Disk 346 has one or more apertures or slots 370 formed between radially outwardly extending fingers or tabs 372. Apertures or slots 370 permit fluid flow axially therethrough. Fingers or tabs 372 engage guide track 352 and are guided for axial movement therealong. Plunger disk 346 is a ferrous plate, and magnet 348 is secured to cage 342 upstream of ferrous plate 346. Cage 342 includes a mounting seat 374 securing magnet 348 thereto and spacing the magnet from ferrous plate 346 by a magnetic gap 376 of defined axial length in the closed position. Apertures 364 of face plate 362 laterally circumscribe mounting seat 374 and magnet 348.

Figure 13:
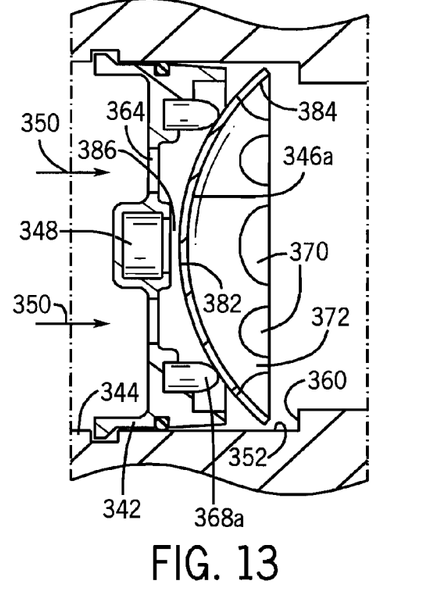
FIG. 13 is like FIG. 12 and shows another embodiment.

FIG. 13 is like FIG. 12 and uses like reference numerals where appropriate to facilitate understanding. In FIG. 13, disk 346 has a curvilinear shape in axial cross-section as shown at 346a. Disk 346a is bowed concavely upstream such that a central portion 382 of the disk is further upstream than a laterally outward portion 384 of the disk. Central portion 382 is axially spaced from magnet 348 in the closed position by a magnetic gap 386 having an axial length controlled by the degree of concave curvature of disk 346a, and the axial length of annular sealing gasket 368a.

Figure 14:
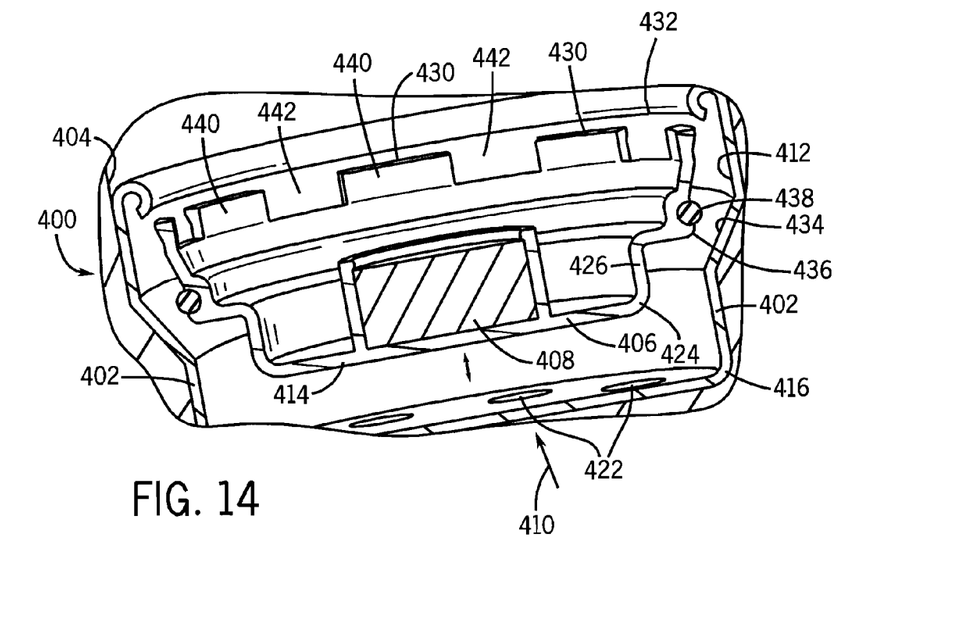
FIG. 14 is a sectional perspective view showing another embodiment.
Figure 15:
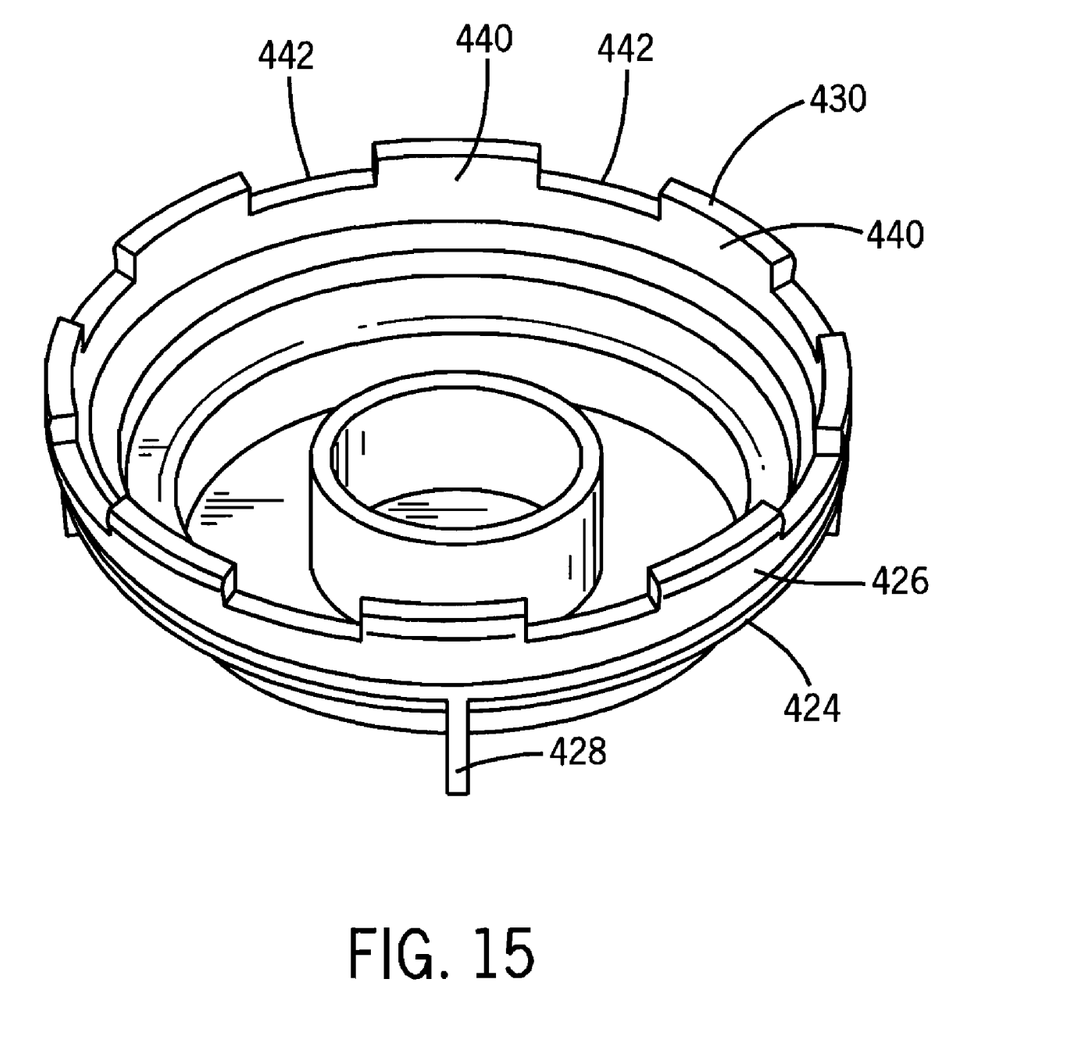
FIG. 15 is a perspective elevation view of one of the components of FIG. 14.

FIG. 14 shows a magnetic check valve 400 including a cage 402 mountable in a fluid flow duct 404 and supporting a plunger 406 movable between a closed position blocking fluid flow past the valve, and an open position permitting fluid flow past the valve. Plunger 406 has a magnet 408 mounted thereto, and cage 402 is ferrous material magnetically attracted to magnet 408 to magnetically bias plunger 406 to the closed position. Fluid flows axially in duct 404 along an axial flow direction 410 from upstream to downstream (upwardly in FIG. 14). Plunger 406 slides axially in the duct in axial sliding relation along an axial guide track 412 along cage 402. Plunger 406 includes a disk 414 spanning laterally relative to axial flow direction 410 and magnetically biased in an upstream axial direction (downwardly in FIG. 14) to the closed position, and movable in a downstream axial direction from the closed position to the open position against the magnetic bias. Cage 402 is provided by a first cup-shaped member 416 having an apertured lateral face plate 418 and a first axial sidewall 420 extending downstream therefrom. Apertures 422 in face plate 418 permit fluid flow axially therethrough. Plunger 406 is provided by a second cup-shaped member 424 having a lateral disk 414 and a second axial sidewall 426 extending downstream therefrom. Disk 414 is downstream of and axially faces face plate 418. Sidewall 426 is laterally inward of and laterally faces sidewall 420. Cup-shaped member 424 is nested in and downstream of cup-shaped member 416. Cage 402 provided by cup-shaped member 416 includes a ferrous plate at 418, and magnet 408 secured to plunger 406 provided by cup-shaped member 424 is downstream of plate 418. Sidewall 420 of cup-shaped member 416 guides axial movement of sidewall 426 of cup-shaped member 424. Cup-shaped member 424 may include axially extending legs 428, FIG. 15, for further guiding movement of plunger 406 along sidewall 420 of cup-shaped member 416. Shoulders 430 of cup-shaped member 424 are engagable with turned-in lip 432 of cup-shaped member 416 to limit and stop opening movement of the valve. Cup-shaped members 416 and 424 are engagable along respective sealing surfaces 434 and 436 in sealing relation in the closed position of the valve, and may include a sealing gasket 438 therebetween in sealing engagement. One or both of the sealing surfaces may be beveled along a taper, for example as shown at 434, providing increasing tightness of fit against the other sealing surface upon axial advancement of plunger 406 to the closed position. Cup-shaped member 424 has a plurality of axially extending legs 440 laterally spaced by gaps 442 therebetween permitting fluid flow therethrough in the open valve position.

The above-described structures and configurations provide simple geometry for cost-efficient manufacturability. The various structures disclosed for controlling the magnetic air gap in the closed valve position are deemed desirable for controlling the initial magnetic or cracking force which must be overcome by fluid flow pressure in the duct to open the valve against the noted magnetic bias. The control of such magnetic air gap is also desirable to control the force holding the valve in the closed position, to prevent leakage. The enablement of a selective choice of magnets is deemed desirable, e.g. selection of ring-shaped magnets, less expensive cylindrical magnets, disk-shaped magnets, and so on. A simple-geometry stamped-plate plunger for flow shut-off may be desirable in various applications as compared to metal balls or the like in check valves. The snap-in mounting of the cage in the duct and/or the plunger in the cage with limited travel and snap-fit features on retaining legs, etc. all contribute to reduced manufacturing cost.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A magnetic check valve comprising a cage mountable in a fluid flow duct and supporting a plunger moveable between a closed position blocking fluid flow past said valve, and an open position permitting fluid flow past said valve, one of said cage and said plunger including a magnet, the other of said cage and said plunger including ferrous material magnetically attracted to said magnet to magnetically bias said plunger to said closed position, wherein fluid flows axially in said duct, and said plunger slides axially in said duct in axial sliding relation along an axial guide track, wherein said fluid flows along an axial flow direction from upstream to downstream in said duct, said plunger comprises a disk spanning laterally relative to said axial flow direction and magnetically biased in an upstream axial direction to said closed position, and moveable in a downstream axial direction from said closed position to said open position against said magnetic bias, and wherein said plunger has at least one leg extending axially upstream from said disk, and said cage comprises a plate having at least one guide bore receiving said leg and guiding axial movement of said leg therethrough.

2. The magnetic check valve according to claim 1 wherein said plunger has a central said leg providing a pedestal extending axially upstream from said disk, and said plate has a central said guide bore receiving said pedestal and guiding axial movement of said pedestal therethrough, said pedestal providing said guide track.

3. The magnetic check valve according to claim 2 wherein said plate has a plurality of apertures around said central guide bore, said apertures permitting fluid flow axially therethrough.

4. The magnetic check valve according to claim 2 wherein said magnet is an annular ring magnet circumscribing said pedestal.

5. The magnetic check valve according to claim 2 wherein said pedestal has first and second shoulders axially spaced therealong, said first shoulder engaging said plate at said central guide bore during downstream axial movement of said pedestal along said central guide bore to limit and stop opening of said valve, said second shoulder being axially spaced downstream from said first shoulder and providing a mounting location for said magnet and setting the axial length of magnetic gap between said plate and said magnet in said closed position.

6. The magnetic check valve according to claim 2 wherein said pedestal comprises a plurality of extension legs extending axially through said central guide bore, said extension legs being laterally spaced by gaps therebetween permitting fluid flow therethrough.

7. The magnetic check valve according to claim 1 wherein said plunger has a plurality of said legs extending axially therefrom, and said cage comprises a plate having one or more guide bores each receiving one or more of said legs and guiding axial movement of said legs therethrough, said legs providing said guide track.

8. The magnetic check valve according to claim 7 wherein said magnet is secured to said plunger downstream of said plate and is adjacent said plate in said closed position and is axially spaced downstream from said plate in said open position.

9. The magnetic check valve according to claim 8 wherein said magnet is disk-shaped and spans laterally relative to said axial flow direction and is circumferentially surrounded by said plurality of legs.

10. The magnetic check valve according to claim 7 wherein said plate has a plurality of apertures laterally spaced from said guide bores, said apertures permitting fluid flow axially therethrough.

11. A magnetic check valve comprising a cage mountable in a fluid flow duct and supporting a plunger moveable between a closed position blocking fluid flow past said valve, and an open position permitting fluid flow past said valve, one of said cage and said plunger including a magnet, the other of said cage and said plunger including ferrous material magnetically attracted to said magnet to magnetically bias said plunger to said closed position, wherein fluid flows axially in said duct, and said plunger slides axially in said duct in axial sliding relation along an axial guide track, wherein said fluid flows alone an axial flow direction from upstream to downstream in said duct, said plunger comprises a disk spanning laterally relative to said axial flow direction and magnetically biased in an upstream axial direction to said closed, position, and moveable in a downstream axial direction from said closed position to said open position against said magnetic bias, wherein said cage has at least one leg extending axially downstream therefrom and guiding axial movement of said disk therealong, and wherein said cage has a plurality of said legs extending axially downstream therefrom and laterally circumscribing said disk and guiding said disk for axial movement therealong.

12. The magnetic check valve according to claim 11 wherein said cage has an upstream face plate spanning laterally relative to said axial flow direction, said face plate having one or more apertures permitting fluid flow axially therethrough, said legs of said cage being laterally spaced by gaps therebetween permitting fluid flow therethrough, said disk in said closed position engaging said face plate along a sealing surface laterally circumscribing said one or more apertures.

13. The magnetic check valve according to claim 12 wherein said legs have a stop shoulder spaced axially downstream of said face plate and engaging said disk during downstream axial movement of said disk to limit and stop opening of said valve.

14. A magnetic check valve comprising a cage mountable in a fluid flow duct and supporting a plunger moveable between a closed position blocking fluid flow past said valve, and an open position permitting fluid flow past said valve, one of said cage and said plunger including a magnet, the other of said cage and said plunger including ferrous material magnetically attracted to said magnet to magnetically bias said plunger to said closed position, wherein fluid flows axially in said duct, and said plunger slides axially in said duct in axial sliding relation along an axial guide track, wherein said fluid flows along an axial flow direction from upstream to downstream in said duct, said plunger comprises a disk spanning laterally relative to said axial flow direction and magnetically biased in an upstream axial direction to said closed position, and moveable in a downstream axial direction from said closed position to said open position against said magnetic bias, wherein said cage has an upstream face plate spanning laterally relative to said axial flow direction, said face plate having one or more apertures permitting fluid flow axially therethrough, said disk in said closed position engaging said face plate along a sealing surface laterally circumscribing said one or more apertures, wherein said cage has said guide track extending axially downstream from said face plate and laterally circumscribing said sealing surface and laterally circumscribing and engaging said disk and guiding said disk for axial movement therealong, and wherein said disk has one or more apertures permitting fluid flow axially therethrough, said one or more apertures being laterally spaced between said sealing surface and said guide track.

15. The magnetic check valve according to claim 14 wherein said guide track comprises a plurality of circumferentially spaced legs separated by circumferential lateral gaps permitting fluid flow therethrough.

16. The magnetic check valve according to claim 14 wherein said guide track has a stop shoulder spaced axially downstream of said face plate and engaging said disk during downstream axial movement of said disk to limit and stop opening of said valve.

17. A magnetic check valve comprising a cage mountable in a fluid flow duct and supporting a plunger moveable between a closed position blocking fluid flow past said valve, and an open position permitting fluid flow past said valve, one of said cage and said plunger including a magnet, the other of said cage and said plunger including ferrous material magnetically attracted to said magnet to magnetically bias said plunger to said closed position, wherein fluid flows axially in said duct, and said plunger slides axially in said duct in axial sliding relation along an axial guide track, wherein said fluid flows along an axial flow direction from upstream to downstream in said duct, said plunger comprises a disk spanning laterally relative to said axial flow direction and magnetically biased in an upstream axial direction to said closed position, and moveable in a downstream axial direction from said closed position to said open position against said magnetic bias, wherein said cage has an upstream face plate spanning laterally relative to said axial flow direction, said face plate having one or more apertures permitting fluid flow axially therethrough, said disk in said closed position engaging said face plate along a sealing surface laterally circumscribing said one or more apertures, wherein said cane has said guide track extending axially downstream from said face plate and laterally circumscribing said sealing surface and laterally circumscribing and engaging said disk and guiding said disk for axial movement therealong, wherein said disk comprises a ferrous plate, and said magnet is secured to said cage upstream of said ferrous plate, and wherein said cage comprises a mounting seat securing said magnet thereto and spacing said magnet from said ferrous plate by a magnetic gap of defined axial length in said closed position, said face plate having a plurality of apertures laterally circumscribing said mounting seat and said magnet, and wherein said face plate comprises an annular segment spanning laterally between said mounting seat and said sealing surface, said annular segment having said plurality of apertures therethrough, said annular segment having an outer border at said sealing surface, said annular segment having an inner border at said mounting seat, said annular segment being tapered upstream as it laterally spans from said outer border to said inner border such that said inner border is axially spaced from said disk in said closed position by a first axial gap, the degree of said taper controlling the magnetic gap between said disk and said magnet provided by said first axial gap.

18. The magnetic check valve according to claim 17 wherein said outer border is spaced from said disk by a second axial gap, and wherein said first axial gap is greater than said second axial gap.

19. A magnetic check valve comprising a cage mountable in a fluid flow duct and supporting a plunger moveable between a closed position blocking fluid flow past said valve, and an open position permitting fluid flow past said valve, one of said cage and said plunger including a magnet, the other of said cage and said plunger including ferrous material magnetically attracted to said magnet to magnetically bias said plunger to said closed position, wherein fluid flows axially in said duct, and said plunger slides axially in said duct in axial sliding relation along an axial guide track, wherein said fluid flows along an axial flow direction from upstream to downstream in said duct, said plunger comprises a disk spanning laterally relative to said axial flow direction and magnetically biased in an upstream axial direction to said closed position, and moveable in a downstream axial direction from said closed position to said open position against said magnetic bias, wherein said disk has a curvilinear shape in axial cross-section, and wherein said disk is bowed concavely upstream such that a central portion of said disk is further upstream than a laterally outward portion of said disk, said magnet is secured to said cage, and said central portion is axially spaced from said magnet in said closed position by a magnetic gap having an axial length controlled by the degree of concave curvature of said disk.

20. A magnetic check valve comprising a cage mountable in a fluid flow duct and supporting a plunger moveable between a closed position blocking fluid flow past said valve, and an open position permitting fluid how past said valve, one of said cage and said plunger including a magnet, the other of said cage and said plunger including ferrous material magnetically attracted to said magnet to magnetically bias said plunger to said closed position, wherein fluid flows axially in said duct, and said plunger slides axially in said duct in axial sliding relation along an axial guide track, wherein said fluid flows along an axial flow direction from upstream to downstream in said duct, said plunger comprises a disk spanning laterally relative to said axial flow direction and magnetically biased in an upstream axial direction to said closed position, and moveable in a downstream axial direction from said closed position to said open position against said magnetic bias, and wherein said cage comprises a first cup-shaped member having an apertured lateral face plate and a first axial sidewall extending downstream therefrom, and said plunger comprises a second cup-shaped member having a lateral said disk and a second axial sidewall extending downstream therefrom, said disk being downstream of and axially facing said face plate, said second sidewall being laterally inward of and laterally facing said first sidewall, said second cup-shaped member being nested in and downstream of said first cup-shaped member.

* * * * *